United States Patent [19]

Skelley et al.

[11] Patent Number: 5,206,002
[45] Date of Patent: Apr. 27, 1993

[54] PROCESS FOR REMOVING $NO_x$ AND $SO_x$ FROM EXHAUST GAS

[75] Inventors: Arthur P. Skelley, Pittsburgh; James C. McMichael, Monroeville; James T. Cobb, Jr., Pittsburgh; Wesley M. Rohrer, Jr., Pittsburgh; Phillip E. Custer, II, Pittsburgh; Taha M. Elsubki, Pittsburgh, all of Pa.

[73] Assignee: Cannon Boiler Works, Inc., New Kensington, Pa.

[21] Appl. No.: 751,728

[22] Filed: Aug. 29, 1991

[51] Int. Cl.[5] ................... C01B 21/00; C01B 17/00
[52] U.S. Cl. ............................ 423/235; 423/242.1; 423/393; 423/243.02
[58] Field of Search .......... 423/242 R, 244 R, 235 D, 423/235, 239, 239 A, 393

[56] References Cited

U.S. PATENT DOCUMENTS

| | | | |
|---|---|---|---|
| 3,120,479 | 2/1964 | Dols et al. | 204/157 |
| 3,473,298 | 10/1969 | Berman | 55/222 |
| 3,775,948 | 12/1973 | Beam | 55/238 |
| 3,881,004 | 4/1975 | Kelly et al. | 423/235 |
| 3,957,949 | 5/1976 | Senjo et al. | 423/235 |
| 3,960,992 | 6/1976 | Cyrenne | 261/152 |
| 3,997,415 | 12/1976 | Machi et al. | 204/157 |
| 4,011,298 | 3/1977 | Fukui et al. | 423/235 |
| 4,035,470 | 7/1977 | Senjo et al. | 423/235 |
| 4,107,271 | 8/1978 | Atsukawa et al. | 423/235 |
| 4,119,702 | 10/1978 | Azuhata et al. | 423/235 |
| 4,121,541 | 10/1978 | Kneissl et al. | 122/1 R |
| 4,240,798 | 12/1980 | Wendelin et al. | 23/230 |
| 4,247,321 | 1/1981 | Persinger | 423/235 |
| 4,351,811 | 9/1982 | Matsuda et al. | 423/239 |
| 4,541,999 | 9/1985 | Bechthold et al. | 423/235 |
| 4,562,053 | 12/1985 | Andersson | 423/235 |
| 4,564,510 | 1/1986 | Bechthold et al. | 423/235 |
| 4,590,047 | 5/1986 | Donnelly et al. | 423/242 |
| 4,681,744 | 7/1987 | Weitman | 422/173 |
| 4,784,835 | 11/1988 | Fritz | 422/170 |
| 4,799,941 | 1/1989 | Westermark | 55/90 |
| 4,971,777 | 11/1990 | Firnhaber et al. | 423/235 |
| 4,999,167 | 3/1991 | Skelley et al. | 422/175 |

OTHER PUBLICATIONS

"$NO_x$ Emissions Plummeted Far Below Minimum EPA Standards With No Increase in Fuel Needs", by H. Dain Kelly, Charles Block and Karen L. Kuncl; *Chemical Processing*, Jan. 1977, pp. 22–24.

Perry & Chilton, Chemical Engineers' Handbook, 5th Edition, pp. 11-5 through 11-8 and 18-82 through 18-85.

"Aqueous Scrubbing of Dilute Nitrogen Oxide Gas Mixture" by Gary S. Selby and Robert M. Counce published in *Ind. Eng. Chem. Res.*, vol. 27, No. 10, 1988.

"Kinetics of the Fast Gas Phase Reaction Between Ozone and Nitric Oxide" by Harold S. Johnston and Harvey J. Crosby appeared in *The Journal of Chemical Physics*, vol. 22, No. 4, Apr. 1954.

*Primary Examiner*—Gregory A. Heller
*Attorney, Agent, or Firm*—John M. Adams

[57] ABSTRACT

Exhaust gases containing oxides of nitrogen and sulfur from a fired process heater, a fossil fuel fired boiler, or a chemical process are diverted from a stack prior to admission to the atmosphere through a duct system containing heat exchangers that reduce the exhaust gas from an elevated temperature, if any, to about ambient temperature. Any heat extracted from the exhaust gas may be transferred to the boiler feed water which would serve to reduce the energy cost of operating a boiler. Once the exhaust gas is cooled to about ambient temperature, the gas is then mixed with an oxidant, such as ozone, at a preselected molar ratio to transform the oxides to higher orders of nitrogen and sulfur oxides to increase the absorbability of the nitrogen and sulfur oxides in a reagent solution. The reagent absorbs the oxidized contaminants from the exhaust gas. The oxides are transformed to dilute acids which are then neutralized to form salts that are acceptable for discharge to a municipal waste water treatment plant. The treated exhaust gas is then emitted from an exhaust stack containing contaminants at a level meeting air quality standards. Additionally any heat recovered from the exhaust gas can be used to lower operating costs.

10 Claims, 3 Drawing Sheets

PROCESS FOR REMOVING $NO_x$ AND $SO_x$ FROM EXHAUST GAS

BACKGROUND OF THE INVENTION

1. Field of the Invention

This invention relates to a process for separating contaminants from the exhaust gases generated from combustion of fossil fuels and from chemical processes, and more particularly, to the removal of nitrogen and sulfur oxides from a cold stream of gaseous combustion products such as the removal of nitrogen oxides and sulfur oxides from exhaust gases.

2. Description of the Prior Art

Gas recovery devices are well known and in particular, devices associated with power generation plants and coal, oil or gas/fired boilers and chemical processes for removing $NO_x$ and $SO_x$ from the exhaust gas and fugitive gas recovery streams. An example of conventional devices that not only recover heat from flue gases but also remove the contaminants is disclosed in U.S. Pat. No. 4,121,541 where flue gases from a power generating plant are purified and heat is recovered from the flue gases. Flue gases from the boiler initially enter a heat exchanger, where they are cooled and thereafter contacted with cooling water to remove waste heat. Pollutants contained in the flue gases are partially absorbed by cooling water. Thereafter, the purified flue gas is released with ambient cooling air and to the surrounding atmosphere. This system is characteristic of a wet flue gas scrubber used to remove contaminants in the form of sulfur dioxide, fluorine compounds, nitrogen oxides, etc.

U.S. Pat. No. 4,784,835 discloses a gas scrubber and heat exchanger for removing contaminants from sulfurous flue gases, where a glass fiber mat electrostatic filter retains particles within the flue gases. Other known devices for removing contaminants from exhaust gases emitted from power plants are disclosed in U.S. Pat. Nos. 3,473,298; 4,681,744; and 4,799,941. With these devices, the exhaust gases are first chilled with direct water sprays and thereafter solid contaminants and water soluble substances are removed from the gases by the contacting water. In a spray chamber the water combines with water soluble gases, such as $SO_x$, contained in the gases to form sulfurous and sulfuric acids which are collected with the water spray in a chamber. It is also known as disclosed in U.S. Pat. No. 3,881,004 to recover nitric acid by scrubbing a tail gas with acid or alkaline solution and nitric acids which minimize the discharge of nitrogen oxides to the atmosphere.

While heat recovery devices or economizers are well known, their efficiency needs to be improved because it has been determined that up to 16% of heat escapes uncovered from the stacks equipped with economizers. This in part can be attributed to admitting the exhaust gases at a relatively high exit temperature. Also, in the case of "mass transfer" heat recovery devices the primary function is to recover heat. Generally, the removal of the contaminants from the flue gas stream is incidental. When scrubbing operations are combined with heat removal operations, the process becomes less efficient at heat transfer because a portion of the heat is lost in an effort to remove contaminants.

It is generally recognized that wet scrubbers are designed primarily to remove contaminants and are not efficient in recovering waste heat. Heat removal is considered incidental and adds to the expense of the pollution abatement operation. In many instances after wet scrubbing, flue gas must be reheated to rise up and out of the boiler chimneys. As a result, boilers equipped with gas scrubbing equipment are expensive to maintain and to operate. While it has been suggested by the prior art devices to remove contaminants in the form of $NO_x$ and $SO_x$ emissions from flue gases, the known devices are expensive to operate and waste a substantial amount of energy in the loss of heat that could be otherwise recovered from the flue gases in the process of removing the contaminants from the flue gases.

Therefore, there is need to provide apparatus for removing contaminants, specifically $NO_x$ and $SO_x$ emissions, from exhaust gases that allows for the efficient use of recovered waste heat, while at the same time reducing the content of the contaminants in the exhaust gases to the required levels as prescribed by air quality regulations. Improved emission equipment is therefore required that not only brings the content of the contaminants in the exhaust gases into compliance with regulated air quality standards, but also lowers the cost of the treatment process by recovering heat from the treated exhaust gases to lower the operating cost of the combustion or chemical processing unit generating the exhaust gases.

SUMMARY OF THE INVENTION

In accordance with the present invention, there is provided a process for removing contaminants from the exhaust gas that includes the steps of directing exhaust gas containing contaminants at an elevated temperature from a process system stack to an exhaust duct. The contaminated exhaust gas is conveyed through a series of heat exchangers in the exhaust duct to reduce and control the temperature of the contaminated exhaust gas. The exhaust gas is cooled from an elevated temperature to about ambient temperature. The exhaust gas is mixed at about ambient temperature with an oxidant to oxidize the contaminants in the exhaust gas. The oxidized contaminants in the exhaust gas are contacted with liquid reagent. The oxidized contaminants are absorbed from the exhaust gas into the liquid reagent solution. Thereafter, the exhaust gas is discharged at about ambient temperature and substantially free of the contaminants from the exhaust duct.

Further in accordance with the present invention, there is provided an apparatus for removing nitrogen and sulfur oxides from the exhaust gases of a chemical process that includes means for conveying exhaust gases containing nitrogen and sulfur oxides from a chemical process through heat exchangers to remove heat from the exhaust gases and reduce the temperature from an elevated temperature to a preselected reduced temperature. A source of an oxidant is provided. A reaction chamber mixes the exhaust gases, reduced in temperature, and the oxidant to convert the nitrogen and sulfur oxides in the exhaust gases to a higher order of nitrogen and sulfur oxides. A chamber receives a gas stream containing higher order nitrogen and sulfur oxides and injects a liquid into the gas stream to convert the nitrogen and sulfur oxides to dilute acids of nitrogen and sulfur and to neutralize the acids to salts.

Additionally, the present invention is directed to a method for removing nitrogen and sulfur oxides from a cooled stream of exhaust gases from a chemical process that includes the steps of mixing the stream of exhaust gases with an oxidant to oxidize the nitrogen and sulfur oxides to a preselected order of nitrogen oxides and sulfur oxides. A liquid spray is introduced into the stream of oxidized exhaust gases. The nitrogen and sulfur oxides are transformed to dilute acids. The dilute acids are neutralized to form salts in solution. The salts in solution are disposed.

Accordingly, a principal object of the present invention is to provide method and apparatus for reducing the content of contaminants, such as $NO_x$ and $SO_x$, from exhaust gases to a level required by air quality standards while at the same time reducing the cost of removing the contaminants by recovering both sensible and latent heat from the exhaust gases admitted from a chemical process.

Another object of the present invention is to provide method and apparatus for treating emissions from a combustion process and chemical process that increases the absorption of contaminants, such as $NO_x$ and $SO_x$ emissions, into a solution to remove the contaminants from the exhaust gas.

Another object of the present invention is to provide a method for converting dilute nitrogen and sulfur acids to selected nitrates and sulfates in solution and treating them, if necessary, prior to disposal of the solution.

A further object of the present invention is to provide an improved method for removal of nitrogen and sulfur oxides from a cooled stream of gaseous combustion products that is economically operable and reduces the content of the oxides to a level acceptable within air and water quality control standards.

These and other objects of the present invention will be more completely disclosed and described in the following specification, accompanying drawing, and appended claims.

DESCRIPTION OF THE PREFERRED EMBODIMENTS

Figure 1:
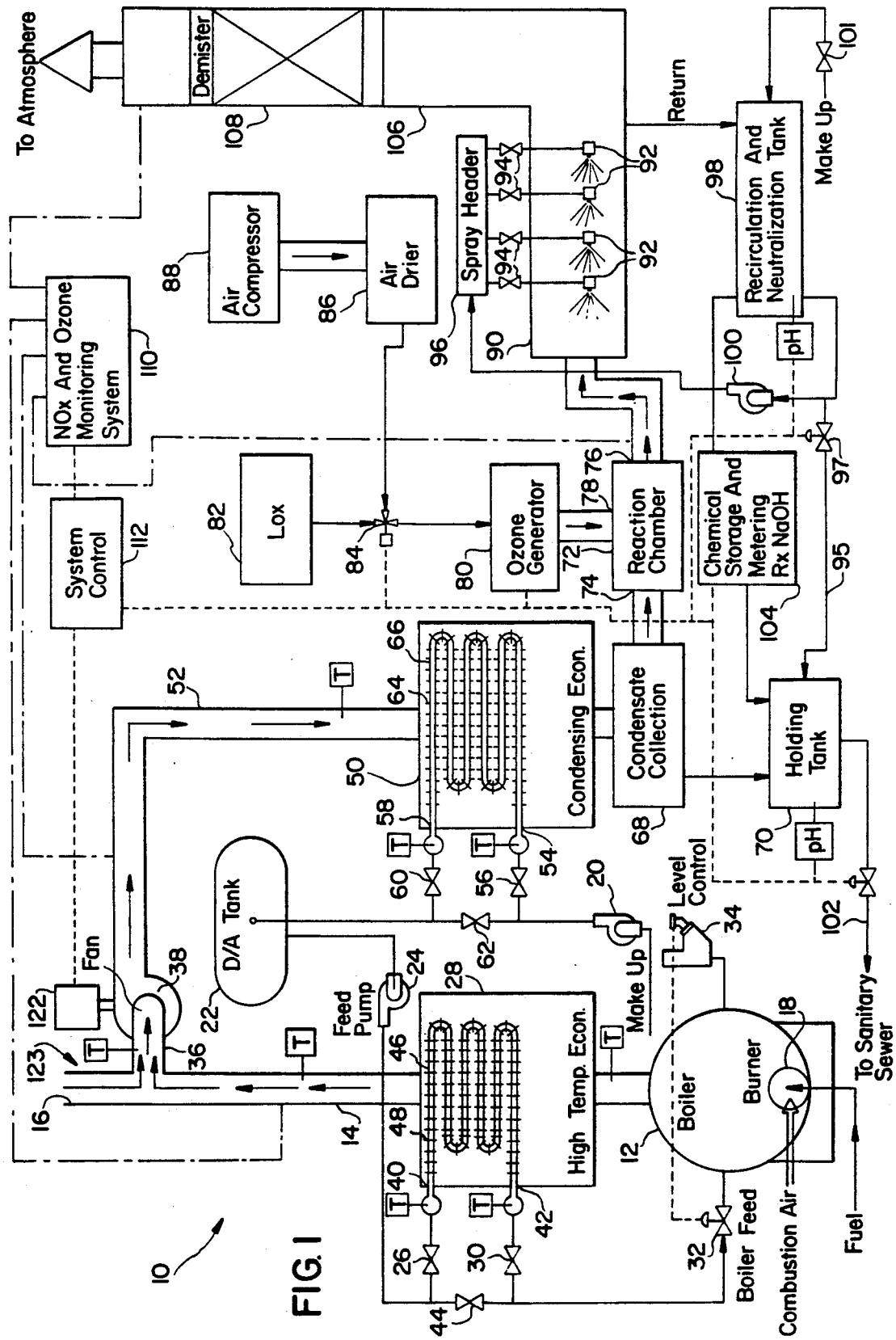
FIG. 1 is a system flow diagram of a process for combining the recovery of waste heat from exhaust gases and removal of contaminants from the exhaust gases.

Referring to the FIG. 1, there is illustrated waste heat recovery apparatus generally designated by the numeral 10 that is utilized with fired process heaters or fossil fueled boilers, such as a packaged firetube or a water-tube boiler. The boiler may be of the type associated with utility power plants or those designed to generate as little as 5 million BTU/hr. In one example, as shown in FIG. 1, a boiler 12 having a capacity of, for example, 125 hp to 1,000 hp, includes a boiler stack 14 having an outlet 16 which may be controlled by an exhaust gas damper (not shown). The boiler 12 is conventional in design and includes a burner 18 that receives a regulated source of combustion air and fuel. Boiler make-up is supplied by a pump 20 from a source of water through a condensing economizer to a deaeration tank 22. From the tank 22 the boiler feed water is fed by pump 24 through a normally open valve 26 to a high temperature economizer 28. The boiler feed water is increased in temperature from about 220° F. to about 280° F. by the economizer 28. The feed water at the elevated temperature is fed from the economizer 28 through a normally open valve 30 to a boiler feed valve 32. The boiler feed valve 32 is regulated by a level controller 34 to maintain a preselected volume of feed water in the boiler 12.

The stack 14 is connected to a supply duct 36 which includes a fan 38 that diverts the combustion exhaust gases from the boiler 12 through the stack 14 and into the supply duct 36. The exhaust gases can be emitted from the stack outlet 16 if desired.

It should be understood that the present invention is adaptable for use with a wide variety of boilers or chemical processes including utility boilers, major process boilers, liquor recovery boilers, as well as, smaller fired process heaters, process steam boilers, and nitric acid plants. In the case of fired process heaters or process steam boilers operating between 125 to 1,000 hp with fuel input of more than 5 million BTU/hr., the temperature of the boiler exhaust gas flowing through the boiler stack 14 is in the range between about 250° F. to 300° F. reduced from 400° F. to 600° F. after the exhaust gas passes through the high temperature economizer 28.

The economizer or heat exchanger 28 is conventional in design and has an inlet 40 connected to valve 26 that receives the deaerated feed water from tank 22. The economizer 28 includes an outlet 42 connected to valve 30 which feeds the feed water heated by the economizer 28 to the boiler feed valve 32. The normally open valves 26 and 30 can be bypassed by a normally closed valve 44 in the event of malfunction, such as a broken tube in the economizer 28. The economizer 28 includes a cooling tube 46 that extends in a serpentine path from inlet 40 to outlet 42. The tube 46 is equipped with cooling fins 48.

Water at temperature of approximately 220° F. from the deaerator tank 22 flows through the tube 46 in the economizer 28. The stack 14 extends to the economizer 28, and the heat from the exhaust gases flowing through the economizer 28 contacts the tube 46 and fins 48 so that the heat from the exhaust gases is transferred from the fins 48 through the walls of the tube 46. The water in the tube 46 is then heated to approximately 280° F. where it exits the economizer 28 through the outlet 42. From the economizer 28 the heated deaerated water is then conveyed to the boiler 12. With this arrangement, the heat extracted from the economizer 28 is used to reduce the amount of fuel consumed by the boiler 12 and serves to reduce the operating costs of the boiler 12.

In practice of the present invention with larger boilers having greater and more diverse fuel input requirements, the sensible heat recovery unit 28 is increased in size to accommodate greater exhaust gas volumes. Often, an economizer or other exhaust gas heat recovery unit is already in place and partially or wholly accomplishes this requirement. Such larger equipment includes megawatt sized utility boilers, major process boilers, liquor recovery boilers, incinerators with or without waste heat recovery boilers or equipment, as well as, refinery and chemical process reactors, heaters and burners, internal combustion engines and gas turbines or other sources of exhaust gas produced from the combustion of fossil fuels. Substantially higher exhaust gas temperatures are often experienced with these other, alternative sources of contaminated and polluting exhaust gases. However, these higher exhaust gas temperatures are accommodated in accordance with the present invention.

From the fan 38, the exhaust gases are conveyed at a temperature of approximately 250° F. to 300° F. to a condensing economizer 50 which is connected downstream of fan 38 in a duct system 52. The economizer 50 includes a water inlet 54 connected by a normally open valve 56 to the source of boiler make-up water through pump 20. A water outlet 58 of economizer 50 is connected through normally open valve 60 to the deaeration tank 22. The economizer 50 can be bypassed by the normally closed valve 62, which when in emergency operation directs the boiler make-up water from the pump 20 directly to the tank 22. The economizer 50 includes the same fin tube construction as the economizer 28 and includes a tube 64 having fins 66. The tube 64 also extends in a serpentine path from the inlet 54 to the outlet 58.

With the exhaust gas entering the economizer 50 through the duct system 52 at a temperature of about 250° F. to 300° F., heat is transferred in the economizer 50 to the water in the tube 64. This water is heated in the tube 64 from an inlet temperature in the range of 60° F. to 80° F. to a temperature in the range of 150° F. to 220° F. when it is conveyed to the tank 22. As a result of the transfer of both latent and sensible heat from the exhaust gases passing through the economizer 50 to the tube 64, the temperature of the exhaust gas is reduced to the range of 125° F. to 140° F. when it exits the economizer 50.

From the economizer 50, the exhaust gases at a temperature in the range between about 125° F. to 140° F. are directed to a condensate collector 68. Moisture in the exhaust gases condenses on the surface of the tube 64 in the economizer 50 and also on the fins 66 as the exhaust gas temperature progressively lowers below the dew point of the exhaust gases. The presence of the moisture on the tube 64 serves to partially scrub or absorb contaminants in the exhaust gases, such as $CO_2$, $SO_x$ and $NO_x$ from the exhaust gases. The condensate is generally acidic and therefore corrosive in nature, particularly at the condensate dew point. The condensate passes from the economizer 50 through the outlet thereof and is received within condensate collector 68. From the collector 68, the condensate is directed to a holding and treatment tank 70.

The economizer 50 is constructed of corrosive resistant materials and functions to rapidly lower the exhaust gas temperature and condenses the water vapor in the exhaust gas to about ambient temperature. At about ambient temperature, the corrosiveness of the condensate is substantially reduced. Also by controlling the temperature of the exhaust gas in this manner, the exhaust gas is prepared to achieve maximum efficiency in the separation of the contaminants from the exhaust gas as will be explained later in greater detail.

Preferably, the temperature of the exhaust gas exiting the economizer 50 is about 130° F. At about ambient temperature the absorbability of the contaminants in the exhaust gas with a reagent solution is greatly enhanced, particularly in the absorption of nitrogen, sulfur, and carbon oxides. The cooled exhaust gas exits the condensate collector 68 and enter a reaction chamber 72 having an inlet 74 connected to collector 68 and an outlet 76. A second inlet 78 of chamber 72 is connected to an ozone generator 80. Ozone generator 80 receives oxygen from either a liquid oxygen tank 82 or an air drier 86 through a 3-way valve 84. Air is supplied to air drier 86 by an air compressor 88. With this arrangement, ozone from the generator 80 is introduced through the inlet 78 into the chamber 72.

In the chamber 72, the ozone reacts with the contaminants in exhaust gas, particularly the $NO_x$ and $SO_x$ contaminants. The nitrogen and sulfur oxide contaminants are oxidized by the presence of the ozone in the reaction chamber 72 to transform the nitrogen and sulfur oxides to higher order oxides. An example of a set of overall reactions that transform NO and $NO_2$ to $N_2O_5$ and take place in chamber 72 are as follows:

$$NO + O_3 \rightarrow NO_2 + O_2$$

$$2NO_2 + O_3 \rightarrow N_2O_5 + O_2$$

$$N_2O_4 + O_3 \rightarrow N_2O_5 + O_2$$

The sulfur oxides are oxidized to sulfur-trioxide and/or the sulfate radical $SO_4$. Preferably in the chamber 72, the ozone functions as a strong oxidant where the ozone is added in the molar ratio in excess of 1.5 moles of ozone to each mole of nitrogen and sulfur oxides. The dimensions of the reaction chamber 72 are selected as to allow the contaminants in the gaseous stream a residence time long enough to oxidize them to higher order oxides. The residence time is dependent upon the initial concentrations of contaminants and temperature. For example, gas flow of 70 ppm of $NO_x$ concentration at 130° F. will require up to 20 seconds residence time in the reaction chamber. For example, the NO and $NO_2$ in the exhaust gas are transformed to higher order nitrogen oxides, such as $N_2O_5$, which substantially increases the absorbability of the nitrogen oxides in a reagent solution which, in turn, substantially reduces the quantity of the $NO_x$ and $SO_x$ contaminants emitted to the atmosphere.

From the reaction chamber 72, the treated contaminants are introduced into a combination spray/absorption chamber 90. Chamber 90 includes an array of spray nozzles 92 connected by valves 94 to a spray header 96. Spray header 96 receives a reagent solution, such as water, from a tank 98 through a pump 100. The treated contaminants are absorbed into the sprayed liquid to form dilute nitrogen and sulfur acids. The dilute acids are converted into nitrates and sulfates.

Concentrated reagents are supplied from a chemical metering and storage tank 104 into recirculation tank 98. Make-up water through valve 101 maintains a constant resettable level of solution in tank 98. To maintain a desirable concentration of nitrates and sulfates in tank 98 an excess of solution is diverted to the holding and treatment tank 70 through control valve 97. The reagent solution is maintained at a suitable concentration by controlling the rate of spent solution to holding tank 70. This concentration is determined and set by the central control computer detecting and metering equipment not to exceed levels permitted by agencies, such as E.P.A. or jurisdictions, such as California's South Coast Air Quality Management District.

The reagent solution, for example sodium hydroxide, is conveyed from tank 98 by pump 100 to the spray header 96. As the exhaust gases enter the chamber 90 the reagent solution is sprayed from the nozzles 92 into contact with the low temperature exhaust gas stream. Preferably the nozzles 92 generate a mist-like spray of reagent solution. In one example, the nozzles generate a reagent spray where droplets are formed having a particle size as small as 20 microns. A spray with droplets of this size is preferred as it increases the area of surface contact of the exhaust gas with the reagent solution. By subjecting the exhaust gas to an atomized reagent spray, the absorbability of the contaminants in the exhaust gas with the reagent is substantially increased.

To further increase the contact of the contaminants with the reagent solution, the exhaust gas may be directed into an absorption enhancer chamber (not shown). In one embodiment the absorption enhancer is a fiberous material structure. The fibers of the structure form an extended surface on which the reagent spray and exhaust gases come into intimate contact. The structure of the fiberous material facilitates the contact of the reagent with the treated contaminants contained in the exhaust gas. Also the period of time that the reagent is in contact with the exhaust gas is enhanced by the extended surface area provided by the fiberous material structure. The details of a suitable absorption enhancer chamber for use with the present invention are disclosed in U.S. Pat. No. 4,999,167 issued to Arthur P. Skelley and James C. McMichael on Mar. 12, 1991, entitled "Low Temperature $NO_x/SO_x$ Removal Apparatus" which is incorporated herein by reference.

All moisture condensed from the exhaust gases and reagent solutions containing the contaminants which have combined with the reagent pass from the chamber 90 through return conduit into tank 98. The reagent solution in tank 98 is constantly being recirculated with controlled discharge to holding and treatment tank 70 through conduit 95 having valve 97. The fluid level in tank 98 is maintained by the addition of make-up water from a source through a valve 101. Periodically, the spent reagent containing the contaminants is withdrawn from tank 70 and is safely conveyed therefrom to a water treatment plant (not shown) or a sanitary sewer 102.

The higher order oxides formed in the chamber 72 are introduced into the chamber 90 where they are transformed to dilute acids, such as $HNO_3$, $HONO$, $H_2SO_3$ and $H_2SO_4$. These acids are then neutralized in the the presence of, for example, salts hydroxide supplied to the tank 98 from a metered chemical supply source 104. The dilute acids are neutralized by, for example, sodium hydroxide in the tank 98 to form harmless solids, such as sodium nitrate and sodium sulfate. These salts, soluble in water, are acceptable for discharge into the sanitary sewer 102. In addition, suitable steps can be taken to remove $NO_x$ AND $SO_x$ contaminants by calcium hydroxide as disclosed in detail in U.S. Pat. No. 4,999,167, incorporated herein by reference.

The exhaust gases exit the chamber 90 substantially free of contaminants and enter a stack 106 connected to the chamber outlet. A demister 108 is positioned in the stack 106 and removes any moisture that may remain in the exhaust gas. A suitable monitoring system 110 is connected to the stack 106 and other points and is operable to determine whether the content of the exhaust gas in the stack 106 meet the required air quality standards set forth by applicable state and federal laws. The monitoring system 110 signals a control system 112 to make necessary adjustments in the waste heat recovery apparatus 10. For example the control system 112 controls the supply of liquid oxygen introduced into the ozone generator 80 and the supply of ozone to the chamber 72. In addition the control system 112 maintains the required concentration of reagent in the neutralization tank 98.

Figure 2:
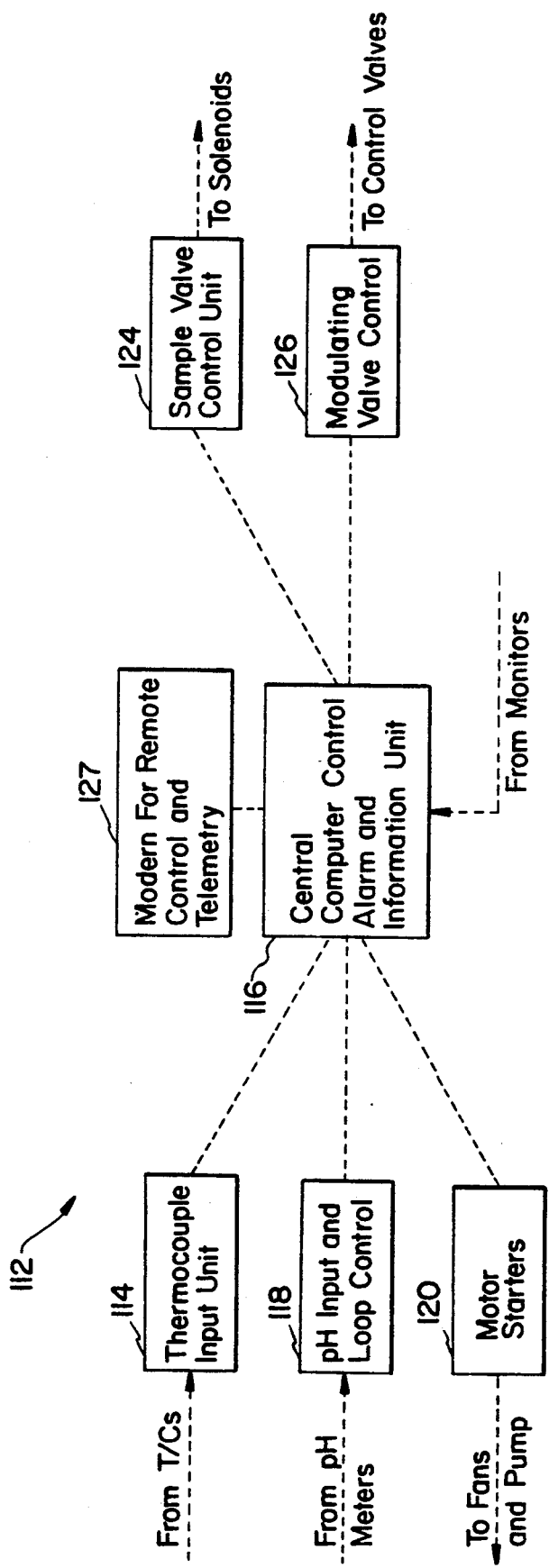
FIG. 2 is a diagrammatic illustration of a control mechanism for the system shown in FIG. 1.
Figure 3:
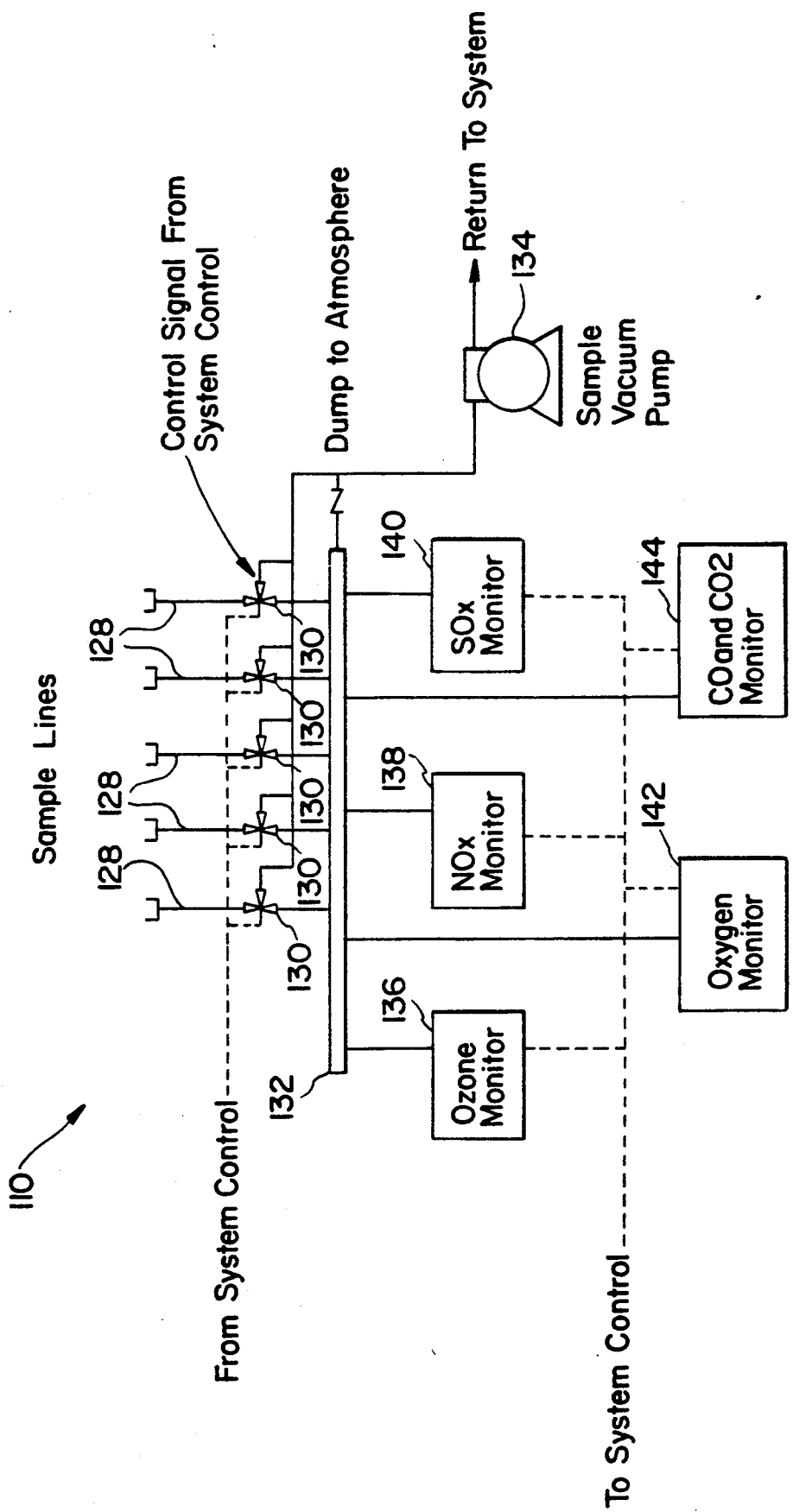
FIG. 3 is a diagrammatic illustration of a monitoring system for measuring the levels of the various gases flowing through the system shown in FIG. 1.

Now referring to FIGS. 2 and 3 there is illustrated the details of the monitoring system 110 and the control system 112. The monitoring system 110 is basically operable to measure and indicate the levels of the various nitrogen oxides, sulfur oxides, carbon oxides, ozone, oxygen level and unburned hydrocarbons. In this respect, the monitoring system 110 as shown in FIG. 1 receives input data on the operation of the apparatus 10 from the stack 14, duct system 52, and stack 106. Readings from these various sources of input data are then transmitted to the control system 112. The control system 112 receives informational input from the monitoring system 110 on the overall performance of the apparatus 10. The control system 112 is operable to change the settings on all of the controllers in the apparatus 10. The system 112 provides logic to start and stop all pumps as necessary and to vary the speed of the fan 38 so that all of the exhaust gas is driven through the duct system 52. A majority of the valves in the system are controlled by loop controllers; however, the control system 112 is operable to take over and directly set any of the valves. Preferably this control system 112 is located at a position convenient for an operator to manage operation of the apparatus 10.

Now referring to FIG. 2 there is schematically illustrated the components of the control system 112. A thermocouple input unit 114 is connected to the apparatus at all of the locations designated "T" in FIG. 1 and samples the temperatures at the locations T. A responsive electrical input signal is received from each unit 114 at the respective location T by a central computer control 116. The input data from the thermocouple units 114 provides control 116 with an indication of the thermodynamic performance of the apparatus 10 and also the effect the temperature has on the efficiency of the apparatus 10.

A pH input unit 118 is also electrically connected to computer control 116 and receives input data from each of the controller units 118 positioned at the location designated pH in FIG. 1. In this manner, each pH controller is adjusted as required from time to time for control of the pH of the solution. The pH reading is converted by the pH input unit 118 to an electrical signal which is representative of the pH reading at each of the pH controller units 118 at the location designated pH in FIG. 1.

Each of the pumps shown in FIG. 1 is controlled by a motor starter unit 120 which, in turn, is connected to the computer control 116. The respective motor starter units 120 control the operation of each of the pumps and monitor the performance of each of the pumps, providing a responsive output signal representative of pump performance to the computer control 116. In addition, the variable speed fan 38 is controlled by a motor controller unit 120. The fan 38 and associated motor 122 shown in FIG. 1 are operated based on the temperature difference between the exhaust stack 14 out of the high temperature economizer 28 and the inlet through supply duct 36 to fan 38. The fan 38 is controlled to maintain a temperature differential of approximately 3° F. to 5° F. across by a juncture generally designated by the numeral 123. This temperature drop guarantees that a small amount of ambient air is drawn into the duct system 52 which assures that no exhaust gas exits the system via the exhaust stack. The actual setting of the above temperature differential is set by the central computer control 116.

Further, the speed of the fan 38 is controlled by the differential temperature of the exhaust from the high temperature economizer 28 and the supplier inlet duct 36 to the fan 38. This temperature differential can be reset from the central computer control 116. The central computer control 116 receives data identifying the volumetric flow of the exhaust gas to the system.

A sample valve control unit 124 is also connected to the computer control 116. The sample valve control unit 124 is connected to each of the sample solenoids to open and close the solenoids so that readings of the system performance can be obtained at each sample point in the system. A modulating valve control 126 is connected to the computer control 116 and to each of the control valves and is operable to report on the status of each of the control valves. In the event failure should occur of a loop controller, the modulating valve control 126 is operable to make the necessary adjustments through modulating valves.

A modem 127 is also connected to the central computer control 116 to facilitate receipt of remote data readings and for transmitting signals for resetting operating parameters of the system. Thus, the computer control 116 serves as a collection point for all data pertaining to operation and performance of the apparatus 10. The computer control 116 also includes alarm set points, and alarms are signalled from the computer control 116. Accordingly, all operator access to control of the apparatus 10 is achieved through the computer control 116.

Output from the monitoring system 110 is supplied as shown in FIG. 2 to the computer control 116. As illustrated in FIG. 3, the monitoring system 110 includes a plurality of sample lines 128 connected to receive a gas sample from various locations in the apparatus 10, for example from the boiler exhaust, at the outlet of the high temperature economizer 28, from the outlet of the condensing economizer 50, and from the outlet of the reaction chamber 72. The sample lines 128 are connected through valve connections 130 to a plenum 132. Preferably the valve connections 130 include 3-way solenoids valves. Only one of the valves 130 is positioned at a time in an open position to the plenum 132.

The valves 130 are controlled through the sample valve control unit 124 by the computer control 116 shown in FIG. 2. In this respect, the computer control 116 determines the order of the opening and closing of the solenoids 130. Only one set of measurement instruments is necessary in the operation of all of the solenoids 130. Each of the solenoids 130 is also connected to a sample vacuum pump 134 which is also connected to the plenum 132. With this arrangement the time delay in receiving a sample measurement is reduced by operation of the vacuum pump 134 to continuously draw a sample through the plenum 132. In operation, when one of the solenoid valves 130 is opened, the valve 130 is connected to the vacuum pump 134 and maintains a constant flow of the gas being monitored through the respective sample lines 128.

A plurality of individual monitors 136-144 are connected to the plenum 132 and in turn to the computer control 116 as shown in FIG. 2. The monitors 136-144 are operable to draw selected samples of gas from the plenum 132 to determine the concentration of the respective gas sample. For example, the monitors 138 and 140 are operable to monitor the concentrations of the $NO_x$ and $SO_x$ present in the exhaust gas. Each of the monitors 136-144 converts the respective concentration into a electronic signal that is transmitted to the central computer control 116 for analysis. Also, the exhaust from the plenum 132 is directed back into the system prior to the reaction chamber 72 and after the sampling point for the condensing economizer 50.

In the operation of the ozone generator 80 by the control system 112 several factors control the output of the ozone generator 80. These factors include the amount of $NO_x$ entering the system, the level of $NO_x$ leaving the system, and the level of ozone leaving the system. In the event an increase in the gas flow volume should be detected as measured by the temperature differential at the gas flow juncture 123 or an increase in the $NO_x$ input concentration as detected by the monitoring system 110, the output of the ozone generator 80 automatically increases.

In the event the level of $NO_x$ exiting the system should exceed a set point or indicate a trend exceeding a set point, as also determined by the monitoring system 110, the output of the ozone generator 80 increases. In the event the level of ozone exiting the system is detected as exceeding a permissible level, then the capacity of the ozone generator 80 to produce ozone is reduced and an alarm is sounded. In the event the ozone generator 80 would be unable to generate sufficient ozone with dried compressed air from air drier 86 and compressor 88, then the oxygen mixing valve 84 is actuated to supply pure oxygen from tank 82 to the generator 80. Up to three times as much ozone can be generated from pure oxygen as from air; consequently, the use of the tank 84 by operation of the valve 84 provides increased efficiency in the amount of ozone that can be generated.

The pH of the recirculation and neutralization tank 98 is initially set and is capable of being reset by remote telemetry through the modem 127 connected to the central computer control 116. The desired pH level is maintained by the addition of chemicals from the chemical and storage and metering tank 104. Additionally, the pH of the holding tank 70 is set in accordance with applicable regulations, and this pH is attained prior to the dumping of the contents of the holding tank 70.

The level of concentration of the contaminants in the recirculation and neutralization tank 98 is measured and the level recorded as data transmitted to the central computer control 116. As the concentration of contaminates in the tank 98 increases, the increase is monitored by the monitoring system 110. When the concentration exceeds a preset limit, the central computer control 116 is actuated to operate the modulating valve control 126 to in turn operate valve 97 positioned between tank 97 and tank 70, as shown in FIG. 1. The valve 97 is opened by modulating valve control 126 to allow the contents of the tank 98 to flow to the holding tank 70. The level of water in the tank 98 is also constantly monitored and controlled by operation of a make-up modulating valve 101. When the water level in the tank 98 falls below a preset level, the central computer control 116 again actuates the modulating valve control 126 to open the valve 101 to permit the water level in tank 98 to be restored to the required level.

With the above arrangement the exhaust gas is emitted from the stack 106 into the atmosphere as an emission that meets the air quality standards established by such public agencies as the E.P.A. or California's South Coast Air Quality Management District. For example, with the present invention the emissions from the stack 106 contain less than 2 ppm of $NO_x$ contaminants. The exhaust gas is emitted at a relatively low temperature due to the recovery of heat which improves the total efficiency of the boiler 12. Not only is the boiler efficiency enhanced by a maximum recovery of heat from the exhaust gas but by reducing the exhaust gas to about ambient temperature, the solubility of the contaminants with the reagent solution is substantially increased.

According to the provisions of the patent statutes, we have explained the principle, preferred construction and mode of operation of our invention and have illustrated and described what we now consider to represent its best emodiments. However, it should be understood that, with in the scope of the appended claims, the invention may be practiced otherwise than as specifically illustrated and described.

We claim:

1. A process for removing nitrogen and sulfur oxide contaminants from exhaust gas comprising the steps of,
   directing exhaust gas containing nitrogen and sulfur oxide contaminants at an elevated temperature from a process system to an exhaust duct,
   conveying the contaminated exhaust gas through a series of heat exchangers in the exhaust duct to reduce and control the temperature of the contaminated exhaust gas,
   reducing the temperature of the exhaust gas from an elevated temperature to about ambient temperature,
   removing moisture from the exhaust gas by condensing water vapor present in the exhaust gas by rapidly lowering the temperature of the exhaust gas,
   mixing the exhaust gas in a reaction chamber with ozone in a molar ratio of at least 1.5 moles of ozone to each mole of nitrogen and sulfur oxides to oxidize the contaminants in the exhaust gas and increase the absorbability of the nitrogen and sulfur oxides in water,
   maintaining the exhaust gas in contact with the ozone in the reaction chamber for a preselected residence time,
   monitoring the residence time of mixing the exhaust gas with the ozone in the reaction chamber to assure substantially complete conversion of all the nitrogen and sulfur oxides in the exhaust gas to $N_2O_5$ and higher order sulfur oxides and substantially complete consumption of all of the ozone in the reaction chamber so that exhaust gas substantially containing $N_2O_5$ and free of ozone is emitted from the reaction chamber,
   introducing the oxidized contaminants substantially containing $N_2O_5$ higher order sulfur oxides in the exhaust gas at about ambient temperature into a combination spray/absorption chamber,
   generating a mist-like spray of water in the spray/absorption chamber,
   admixing the exhaust gas containing substantially $N_2O_5$ with the water mist to transform $N_2O_5$ and sulfur oxides to dilute acids including $HNO_3$ and $H_2SO_4$,
   absorbing the admixture of water mist containing the dilute acids including $HNO_3$ and $H_2SO_4$ in the exhaust gas into liquid water,
   converting the dilute acids to solids including nitrates and sulfates containing the contaminants removed from the exhaust gas in the spray/absorption chamber, and
   thereafter discharging the exhaust gas at about ambient temperature and substantially free of the contaminants from the exhaust duct.

2. A process as set forth in claim 1 which includes, generating ozone in an ozone generator, and supplying the ozone generator with dried compressed air.

3. A process as set forth in claim 1 which includes, monitoring the mass flow of the contaminants in the exhaust gas by measuring the level of concentration and the volume flow rate of the exhaust gas,
   sensing a change in the level of concentration of the contaminants in the exhaust gas or a change in the volume flow rate of the exhaust gas, and
   adjusting the volume of ozone mixed with the exhaust gas in response to a change in the level of concentration of the contaminants in the exhaust gas or a change in the volume of exhaust gas flow.

4. A process as set forth in claim 1 which includes, recirculating the water containing the contaminants in the form of salts from the spray/absorption chamber to a tank, and
   continuously discharging a portion of the contents of the tank to a holding and treatment tank.

5. A process as set forth in claim 1 which includes, monitoring the level of water in a recirculation and neutralization tank, and
   adding water to the tank to maintain the concentration of the water in the tank at a preselected level.

6. A process as set forth in claim 1 which includes, generating ozone in an ozone generator with pure oxygen from a source, and
   mixing the ozone with the exhaust gas in the reaction chamber.

7. A method for removing nitrogen and sulfur oxides from a cooled stream of exhaust gas from a chemical process comprising the steps of,
   condensing water vapor in the exhaust gas to substantially remove all the moisture in the exhaust gas,
   admixing the stream of exhaust gas with a quantity of ozone in a reaction chamber for a preselected residence time,
   oxidizing the nitrogen and sulfur oxides by substantially complete consumption of the ozone in the reaction chamber to higher orders of nitrogen oxides and sulfur oxides,
   adding ozone to the reaction chamber in an amount required to convert substantially all the $NO_x$ in the exhaust gas to $N_2O_5$,
   introducing the oxidized exhaust gas substantially containing $N_2O_5$ and high order sulfur oxides into contact with a mist of water droplets to form $HNO_3$ and $H_2SO_4$ in the exhaust gas,
   absorbing the $HNO_3$ and $H_2SO_4$ in the oxidized exhaust gas into liquid water to form dilute acids of nitrogen and sulfur, and
   neutralizing the dilute acids to form nitrates and sulfates in solution.

8. A method as set forth in claim 7 which includes, cooling the stream of exhaust gas to about ambient temperature, and
   mixing the exhaust gas at about ambient temperature with ozone to convert the nitrogen and sulfur oxides in the exhaust gas to higher order oxides of nitrogen and sulfur.

9. A method as set forth in claim 8 which includes, mixing the nitrogen and sulfur oxides with ozone in a molar ratio in excess of 1.5 moles of ozone to each mole of nitrogen and sulfur oxides.

10. A method as set forth in claim 7 which includes, neutralizing the dilute acids to form soluble salts of nitrogen and sulfur.

* * * * *